UNITED STATES PATENT OFFICE.

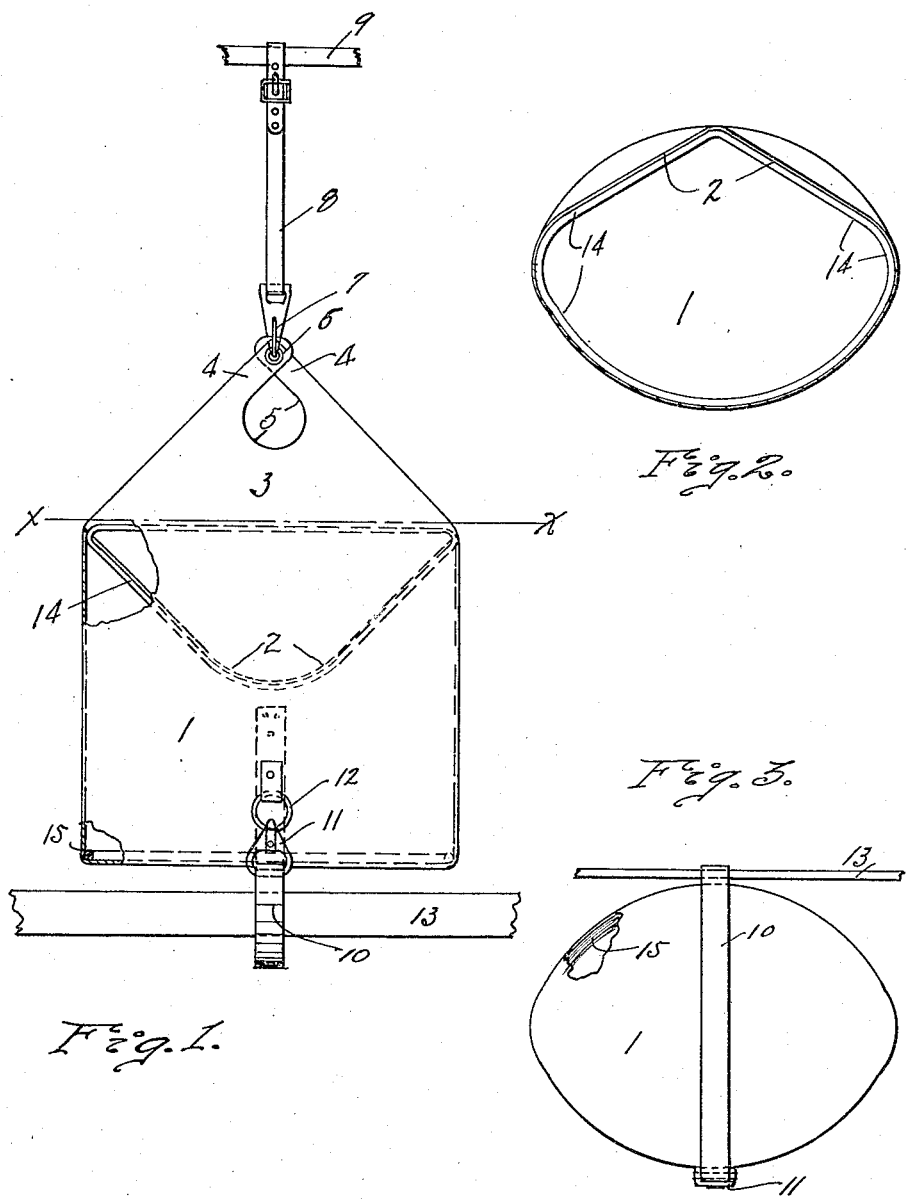

GEORGE S. HORIUCH, OF SEATTLE, WASHINGTON.

SANITARY HARNESS ATTACHMENT.

1,162,359.  Specification of Letters Patent.  Patented Nov. 30, 1915.

Application filed February 9, 1915. Serial No. 7,155.

*To all whom it may concern:*

Be it known that I, GEORGE S. HORIUCH, a citizen of Japan, and a resident of Seattle, in the county of King and State of Washington, have invented certain new and useful Improvements in Sanitary Harness Attachments, of which the following is a full, true, and exact specification.

My invention relates to harness attachments, and has for its principal object: to provide a sanitary device, which is removably attachable to the body of a horse and preferably by means of the harness, for collecting horse manure. The advantages of a device of this general character is in preventing the manure from being deposited upon the streets and thereby forming a nuisance, a breeding place for flies, and the like.

With my device in use, a large proportion of the present labor and expense consumed in sweeping streets would be unnecessary, a cleaner and more sanitary street would result and further, the manure now wasted may be saved and used for fertilizer purposes.

Other objects will appear as my invention is more fully explained in the following specification, illustrated in the accompanying drawings, and pointed out in the appended claims.

In the drawings, Figure 1 is a side elevation of my device. Fig. 2 is a sectional view on line $x$—$x$, of Fig. 1. Fig. 3 is a bottom view of Fig. 1.

Referring more particularly to the drawings, numeral 1 designates a bag of canvas or other pliable material which may be water-proof or lined as desired. The top of the bag 1 is cut away in front as at 2 while the back extends up beyond the main body of the bag as at 3. The extended portion 3 of the bag terminates in ears 4 which are provided with reinforced eyelets 5. The extended portion 3 is cut away as at 5 to provide a place for a horse's tail to pass through. The eyelets 6 are adapted to be slipped over a hook 7 on the end of a strap 8, the other end of said strap being adjustably secured to a strap 9 which is a part of the harness over the back of the horse. The bottom of the bag 1 is provided with a strap 10 to which is secured a snap 11 which is adapted to engage a ring 12 on the side of bag 1. The strap 10 normally passes around the ordinary breeching strap 13 of a harness. The top of the bag 1 is provided with an endless yielding spring member 14 substantially the shape shown so as to make the bag fit snugly against the flesh of the horse and to fit the lines of said flesh and to insure opening of the bag during the depositing of manure. The bottom of the bag 1 is fitted with an endless spreader 15 which holds the bag in substantially the shape shown. The bag may be easily disconnected from the harness as previously described and emptied.

In the use of my device, for example, depots for the collection of manure may be provided at suitable intervals along the alley or street, and which are not separated a sufficient distance to permit the overloading of the receptacles, and into which the contents of the bags or receptacles may be placed from time to time by the driver of the vehicle. From this it will be seen that cities, towns, and like municipalities having ordinances which require the use of my device would obviously have clean and sanitary streets, without the expense of the usual corps of street sweepers and would also avoid the expense and labor of such frequent flushing of the streets as is now required. Furthermore, it will be seen that by thus conveniently and cheaply collecting the contents of the bags, relatively most of the expense of such collection may be obviated by the sale of the collected manure to agriculturists for use as a fertilizer.

While I have shown and described a particular form of embodiment of my invention, I am aware that many minor changes therein will readily suggest themselves to others skilled in the art without departing from the spirit and scope of the invention, and I therefore desire to avoid being limited to the exact form shown and described except as pointed out in the appended claims.

Having described my invention, what I claim as new and desire to protect by Letters Patent is—

1. In a device of the class described, the combination of a mouthed flexible receptacle and means for removably attaching the same to the harness of a draft animal, whereby the excrement of the animal may be collected, a spring member encircling the mouth of the receptacle and a spreader for the bottom of the receptacle.

2. In a device of the class described, the combination of a bag, a spring member encircling the mouth of the bag and a spreader for the bottom of the bag, means for removably attaching the bag to the usual harness of a draft animal, said means including a looped member attached to the bottom of the bag and adapted to be slidably mounted to the breeching of the harness, an extension from the back of the bag which is provided with a cut-away portion adapted to receive the tail of the animal, ears at the top of said extension which are provided with eyelets, a strap having a loop at one of its ends which is adapted to embrace a part of the harness and a hook at the opposite end of the strap which is adapted to engage the said eyelets as and for the purposes set forth.

GEORGE S. HORIUCH.

Witnesses:
R. D. SMALLEY,
ELLA KELLY.

Copies of this patent may be obtained for five cents each, by addressing the "Commissioner of Patents, Washington, D. C."